(12) United States Patent
van Gelder et al.

(10) Patent No.: US 6,626,539 B2
(45) Date of Patent: Sep. 30, 2003

(54) COLOR VIDEO PROJECTION DISPLAY SYSTEM WITH LOW-RETARDANCE COMPENSATOR FILM FOR IMPROVED CONTRAST

(75) Inventors: Roland van Gelder, Hartsdale, NY (US); George Melnik, Montrose, NY (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 09/845,897

(22) Filed: Apr. 30, 2001

(65) Prior Publication Data

US 2002/0159033 A1 Oct. 31, 2002

(51) Int. Cl.$^7$ .......................... G03B 21/14; G03B 21/00
(52) U.S. Cl. .......................................... 353/20; 353/31
(58) Field of Search ..................... 353/20, 34, 30–33

(56) References Cited

U.S. PATENT DOCUMENTS

| | | | |
|---|---|---|---|
| 5,410,370 A | 4/1995 | Janssen | 348/756 |
| 5,416,514 A | 5/1995 | Janssen et al. | 348/196 |
| 5,548,347 A | 8/1996 | Melnik et al. | 348/761 |
| 5,576,854 A * | 11/1996 | Schmidt et al. | 349/117 |
| 5,781,251 A | 7/1998 | Otto | 348/744 |
| 5,845,981 A | 12/1998 | Bradley | 353/31 |
| 5,875,008 A * | 2/1999 | Takahara et al. | 349/10 |
| 5,986,815 A * | 11/1999 | Bryars | 349/5 |

* cited by examiner

Primary Examiner—Russell Adams
Assistant Examiner—Andrew Sever
(74) Attorney, Agent, or Firm—Aaron Waxler

(57) ABSTRACT

A color video projection display system having an improved contrast ratio is disclosed. At least one reflective or transmissive panel, e.g., a liquid crystal on silicon (LCoS) panel, is arranged within the system to receive incident light of one or more designated colors via an input optical path. The reflective or transmissive panel modulates the incident light in accordance with corresponding applied signals, and the resulting modulated light is further processed via an output optical path to generate a viewable display. At least one low-retardance film is arranged within one of (i) the input optical path of the system between an input optical path polarizer and the panel, and (ii) the output optical path of the system between the panel and an output optical path polarizer, so as to increase a contrast ratio of the viewable display. The invention can be implemented in single-panel or multi-panel configurations.

1 Claim, 5 Drawing Sheets

COLOR VIDEO PROJECTION DISPLAY SYSTEM WITH LOW-RETARDANCE COMPENSATOR FILM FOR IMPROVED CONTRAST

FIELD OF THE INVENTION

The present invention relates generally to the field of color video projection display systems, and more particularly to techniques for improving contrast in such systems.

BACKGROUND OF THE INVENTION

In a typical example of a color video projection display system, light from a light source is separated into red, green and blue components. These components in a single panel system are directed sequentially onto a single reflective or transmissive liquid crystal display (LCD) panel which includes a matrix of LCD elements having light reflection or transmission properties that are controllable via signals applied to associated thin-film transistor (TFT) drivers.

An LCD panel modulates the intensity of reflected or transmitted light by changing the polarization of light passing through a liquid crystal layer of the panel. The effect of the LCD panel on the polarization of the reflected or transmitted light depends on factors such as the particular liquid crystal effect used, twist angle, angle of the incident polarization, and retardance. Retardance is also commonly referred to as "optical path length difference." In addition, the polarization change is a function of the voltage applied to the liquid crystal layer. By appropriate variation of the applied voltage, a range of intensity levels including white, black and intermediate gray levels can be generated.

In the above-noted example color video projection display system, the red, green and blue components are scanned across the LCD panel and the LCD elements are controlled in accordance with corresponding red, green and blue signals derived from a video signal, such that each of the components is modulated with its corresponding red, green or blue signal. The resulting modulated components are then directed via a projection lens to a display screen for viewing of the video signal.

More detailed examples of single panel color video projection display systems of the type described above are disclosed in U.S. Pat. No. 5,548,347, issued Aug. 20, 1996 in the name of inventors G. A. Melnik and P. J. Janssen and entitled "Single Panel Color Projection Video Display Having Improved Scanning," which is incorporated by reference herein. Certain of these systems use a transmissive LCD panel, which is also commonly referred to as a "light valve." Other examples of color video projection display systems are disclosed in U.S. patent application Ser. No. 09/097,969 filed Jun. 16, 1998 and entitled "Projection Device," which is incorporated by reference herein.

A three-panel color video projection display system of the type described above generally includes a separate reflective or transmissive LCD panel for each of the red, green and blue components, with the components being spatially separated such that each component is directed to its corresponding LCD panel. Each of the red, green and blue components is modulated in its corresponding panel by an applied red, green or blue signal derived from a video signal. As in the single panel system, the resulting modulated components are directed via a projection lens to a display screen for viewing of the video signal.

A particular type of reflective LCD panel known as a liquid crystal on silicon (LCoS) display panel uses reflective LCD elements arranged on a silicon backplane. LCoS display panels can be used in both single-panel and three-panel configurations, and are becomingly increasingly popular for use in applications such as compact projectors and head-up or "near to the eye" projection display systems. LCoS display panels have a number of significant advantages over other types of reflective LCD panels. For example, crystalline silicon can be used to form active matrix elements of the LCoS panels. The silicon backplane can also be used to form the TFT drivers and other functional circuitry, using well-known and efficient semiconductor manufacturing techniques. Moreover, a larger percentage of the active area can be used for processing video information for display.

Contrast ratio is an important characteristic of a reflective LCoS display panel or other type of reflective LCD panel. The contrast ratio refers generally to the ratio of a black image to a white image. A technique for improving contrast ratio in a reflective LCD panel is described in J. Gandhi et al., "Performance Enhancement of Reflective CMOS TN Displays in Projection Applications Using Compensating Films," SID 99 Digest, Paper 47.3, pp. 990–993, SID 1999, which is incorporated by reference herein. This technique uses a combination of two high-retardance films to provide an improvement in contrast ratio in an off-axis projection system having a reflective LCD panel.

A serious problem with the approach of the above-cited reference is that variation between the angles of the high-retardance films yields corresponding variation in the optical axis of the system and in the retardance as a function of wavelength. The two-film arrangement is thus very difficult to optimize. This problem is exacerbated by the high retardance values of the films. Moreover, the use of two films unduly increases the cost and complexity of the off-axis projection system, particularly in a three-panel configuration.

In view of the foregoing, it is apparent that a need exists for improved techniques for enhancing contrast ratio in projection display systems with reflective or transmissive display panels.

SUMMARY OF THE INVENTION

The present invention provides a color video projection display system with improved contrast ratio.

In accordance with one aspect of the invention, the contrast ratio is improved through the use of a low-retardance film placed in an optical path of the system either on an input optical path between an input optical path polarizer and a reflective or transmissive panel or on an output optical path between the reflective or transmissive panel and an output optical path polarizer. The low-retardance film may be, e.g., a diacetate film having a retardance of less than about 30 nanometers, with its particular retardance value more specifically being selected to optimize a given system configuration.

The present invention can be implemented in single-panel configurations or multi-panel configurations, e.g., three-panel configurations in which each panel is used for modulating one of red, green or blue incident light.

For example, in one illustrative multi-panel embodiment of the invention, a single low-retardance film is arranged within an input optical path of the system after an input optical path polarizer but at a point prior to separation of the incident light into red, green and blue components for application to the panels.

In another illustrative multi-panel embodiment of the invention, a single low-retardance film is associated with each of the panels, such that the three-panel configuration will include three low-retardance films, each placed in an input or output optical path associated with a corresponding one of the panels. In the case of reflective panels, this may or may not be the same path as in the case of transmissive panels, e.g., the implementation may be on-axis or off-axis, respectively.

The reflective or transmissive panels may be liquid crystal on silicon (LCoS) display panels or other types of reflective or transmissive liquid crystal display (LCD) panels, or any other similar type of light valve devices, as well as various combinations thereof.

Advantageously, the use of a low-retardance film in a color video projection display system configured in accordance with the invention prevents variation in the system optical axis and thus considerably simplifies the optimization process, while also reducing the cost and complexity associated with implementation of the system. Moreover, the low retardance value serves to increase the tolerance of the film angle, further simplifying the implementation.

DETAILED DESCRIPTION OF THE INVENTION

The present invention will be illustrated herein using example single-panel and multi-panel color video projection display systems. The invention relates generally to the use of a low-retardance film in conjunction with a reflective or transmissive display panel of such a system in order to improve the contrast ratio of the resulting viewable display.

Figure 1:
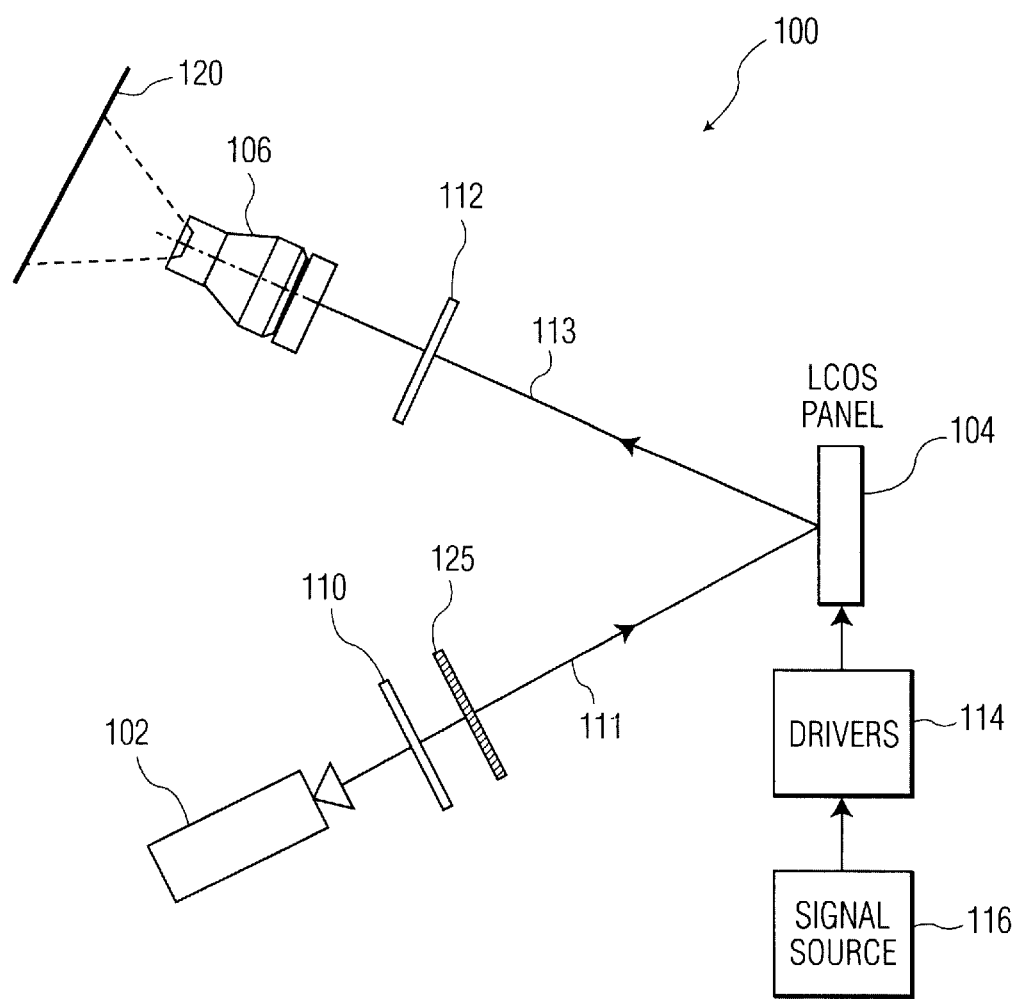
FIG. 1 shows an off-axis reflective single-panel color video projection display system in accordance with a first illustrative embodiment of the invention.

FIG. 1 shows an off-axis single-panel color video projection display system 100 in accordance with a first illustrative embodiment of the invention. The system 100 includes a light source 102, a liquid crystal on silicon (LCoS) display panel 104, and a projection element 106. A polarizer 110 is arranged within the system 100 on an input optical path 111 between the light source 102 and the LCoS panel 104, and a polarizer 112 is arranged within the system 100 on an output optical path 113 between the LCoS panel 104 and the projection element 106.

It should be noted that a polarizer on an output optical path in a color video projection display system is also commonly referred to as an "analyzer." The term "polarizer" as used herein is therefore intended to include devices commonly referred to as analyzers.

The system 100 further includes a set of thin-film transistor (TFT) drivers 114 which receive one or more signal inputs from a signal source 116 and generate corresponding signals for controlling the LCoS panel 104.

In operation, a video signal is processed within signal source 116 to generate therefrom corresponding red, green and blue signals. The light source 102 separates light into red, green and blue components that are properly polarized in polarizer 110 and applied sequentially to the LCoS panel via input optical path 111 in accordance with a designated scanning order. The red, green and blue components are scanned across the LCoS panel 104 and the liquid crystal display (LCD) elements thereof are controlled in accordance with the red, green and blue signals derived from the video signal, such that each of the components is modulated with its corresponding red, green or blue signal. The resulting modulated components are then directed via output optical path 113 and polarizer 112 to projection element 106 which generates a viewable display 120 of the original video signal.

The operation of elements 102, 104, 106, 110, 112, 114 and 116 of system 100 is well understood in the art and will therefore not be described in further detail herein. Additional details regarding particular examples of one or more of these elements as implemented in known color video projection display systems can be found in the above-cited U.S. Pat. No. 5,548,347, in the above-cited U.S. patent application Ser. No. 09/097,969 filed Jun. 16, 1998 and entitled "Projection Device," and in the above-cited reference by J. Gandhi et al. entitled "Performance Enhancement of Reflective CMOS TN Displays in Projection Applications Using Compensating Films."

Further details regarding particular examples of one or more of the above-noted elements can be found in the following U.S. patents, each of which is incorporated by reference herein: U.S. Pat. No. 5,410,370 issued Apr. 25, 1995 in the name of inventor P. J. Janssen and entitled "Single Panel Color Projection Video Display Improved Scanning;" U.S. Pat. No. 5,416,514 issued May 16, 1995 in the name of inventors P. J. Janssen and W. Guerinot and entitled "Single Panel Color Projection Video Display Having Control Circuitry for Synchronizing the Color Illumination System with Reading/Writing of the Light Valve;" U.S. Pat. No. 5,781,251 issued Jul. 14, 1998 in the name of inventor D. Otto and entitled "Method and Apparatus for Optical Scanning For Single Panel Color Projection Video Display;" U.S. Pat. No. 5,845,981 issued Dec. 8, 1998 in the name of inventor R. H. Bradley and entitled "Multi-Color-Band Scrolling Across Single-Panel Light Valve;" and U.S. Pat. No. 5,892,623 issued Apr. 6, 1999 in the name of inventor R. H. Bradley and entitled "Multi-Color-Band Light Source."

In accordance with the present invention, the system 100 of FIG. 1 further includes a single low-retardance film 125 that is arranged within the input optical path 111 between the polarizer 110 and the LCoS panel 104 as shown. The single low-retardance film is preferable a diacetate film having a retardance of less than about 30 nanometers. As noted previously, the term "retardance" as used herein is also commonly known as optical path length difference.

The particular retardance value of the single low-retardance film may be more specifically selected to optimize a given system configuration, as will be readily apparent to those skilled in the art. Diacetate film is preferred due to its low birefringence and low dispersion, where dispersion refers to the change in optical path length over the spectra of interest. The low dispersion allows for compensation of birefringence across the spectra, thus further increasing the contrast ratio.

One example of a diacetate film suitable for use with the present invention is a film having a retardance of about 25 nanometers and commercially available from Clarifoil of Spondon, Derby, UK. Although diacetate films are preferred, other materials may also be used, e.g., other materials having the desirable low birefringence and low dispersion properties of diacetate films. The term "film" as used herein should be understood to include materials commonly referred to as "foils."

Rotational angles of the polarizer 110, polarizer 112, low-retardance film 125 and LCoS panel 104 are preferably optimized for maximum contrast ratio in the system 100.

As will be illustrated below in conjunction with FIG. 3, the single low-retardance film 125 is able to provide substantial contrast improvement in the FIG. 1 system.

The single low-retardance film 125 replaces the two high-retardance films used in the prior art contrast ratio improvement techniques previously described. The present invention provides a number of advantages over these conventional two-film arrangements. For example, the use of a single low-retardance film in a color video projection display system prevents variation in the system optical axis and thus considerably simplifies the optimization process, while also reducing the cost and complexity associated with implementation of the system. Moreover, the low retardance value serves to increase the tolerance of the film angle, further simplifying the implementation.

Figure 2:
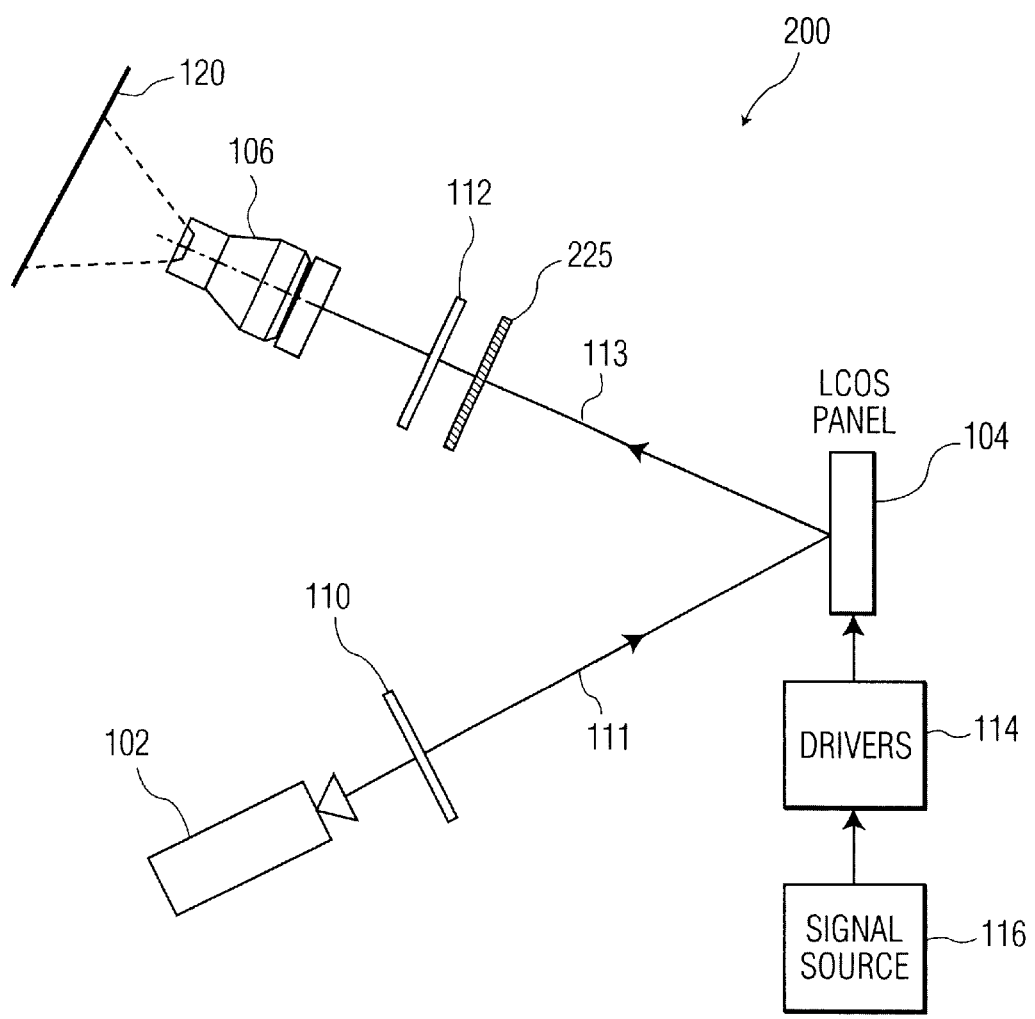
FIG. 2 shows an off-axis reflective single-panel color video projection display system in accordance with a second illustrative embodiment of the invention.

FIG. 2 shows another embodiment of a color video projection system in accordance with the invention. System 200 of FIG. 2 includes elements 102, 104, 106, 110, 112, 114 and 116 as previously described in conjunction with FIG. 1. However, system 200 further includes a single low-retardance film 225 that is arranged within the output optical path 113 between the LCoS panel 104 and the polarizer 112 as shown. Like the film 125 of FIG. 1, the single low-retardance film 225 may be, e.g., a diacetate film having a retardance of less than about 30 nanometers, with its particular retardance value selected to optimize a given system configuration.

The color video projection system arrangements of FIGS. 1 and 2 are shown by way of example only, and numerous alternative arrangements could also be used to implement the techniques of the invention. For example, although illustrated using LCoS display panels, the invention can also be implemented using other types of reflective or transmissive LCD panels, or any other similar type of light valve devices, as well as various combinations of these and other devices. Moreover, the reflective systems of FIGS. 1 and 2 could be readily reconfigured as transmissive systems.

It will be appreciated by those skilled in the art that the color video projection systems of FIGS. 1 and 2 will generally include additional elements such as lenses, support structures, housings, etc. These elements are omitted from the figures for simplicity and clarity of illustration, and may be configured using any of a number of well-known conventional techniques.

Figure 3:
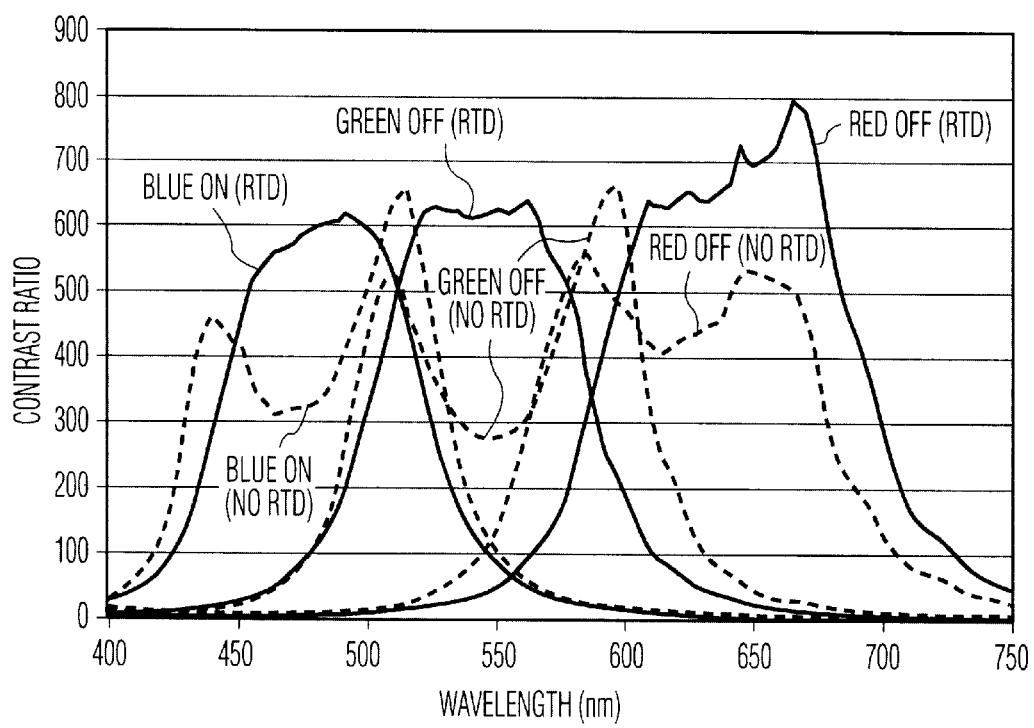
FIG. 3 is a set of plots showing contrast ratio as a function of wavelength in the off-axis reflective single-panel color video projection display system of FIG. 1.

FIG. 3 is a set of plots illustrating the improvement in contrast ratio provided by the single low-retardance film 125 in the projection display system 100 of FIG. 1. The plots show contrast ratio as a function of wavelength in the system 100. The plots in dashed lines show the contrast ratio without the single low-retardance film 125 (no RTD), and the plots in solid lines show the contrast ratio with the single low-retardance film 125 arranged as shown in FIG. 1. It is apparent from the plots that the presence of the single low-retardance film 125 results in a substantial improvement in contrast ratio. Advantageously, this improvement in contrast ratio is achieved without the problems associated with the conventional two-film technique.

FIGS. 4, 5, 6, 7 and 8 show portions of color video projection display systems in accordance with other illustrative embodiments of the invention. In these embodiments, the display systems are on axis transmissive systems, rather than off-axis reflective systems as in the embodiments of FIGS. 1 and 2. It should also be noted that source and projection elements are not shown in FIGS. 4, 5, 6, 7 and 8 for simplicity and clarity of illustration. In addition, those skilled in the art will recognize that the transmissive systems of FIGS. 4, 5, 6, 7 and 8 can be readily reconfigured as reflective systems using known techniques. It should again be emphasized that these and other systems shown herein are by way of example only, and not intended to limit the scope of the invention in any way.

Figure 4:
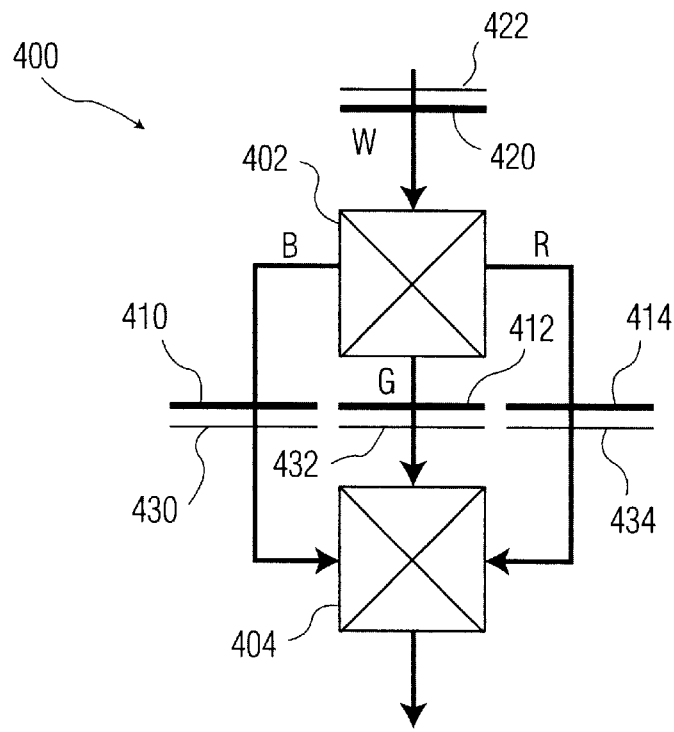
FIGS. 4, 5, 6, 7 and 8 show portions of on-axis transmissive color video projection display systems in accordance with other embodiments of the invention.

Referring to FIG. 4, a color video projection display system 400 comprises a color splitter 402, a color composer 404, three transmissive panels 410, 412 and 414, a single low-retardance film 420, an input optical path polarizer 422, and three output optical path polarizers 430, 432 and 434. White light (W) passes through polarizer 422 and the single low-retardance film 420, and is separated by color splitter 402 into blue (B), green (G) and red (R) components as shown. The blue, green and red components are applied to respective transmissive panels 410, 412 and 414. The resulting output components modulated in the panels by corresponding blue, green and red signals pass through polarizers 430, 432 and 434, and are then recombined in color composer 404 to obtain a modulated light signal suitable for application to a projection element for providing a viewable color display.

In the FIG. 4 embodiment, the single low-retardance film 420 is arranged within an input optical path of the system 400 between input optical path polarizer 422 and each of the three transmissive panels 410, 412 and 414. It should be noted that other embodiments of equal optical value can be implemented substantially as shown in FIG. 4 while reversing the direction of light through the system. In such a case, the single low-retardance film 420 may be in an output path before the output path polarizer, in a manner similar to that described previously in conjunction with FIG. 2. Those skilled in the art will also immediately recognize that such an arrangement could be applied to reflective LCD panels such as LCoS panels in an on-axis or off-axis configuration, as in the embodiments of FIGS. 1 and 2.

Figure 5:
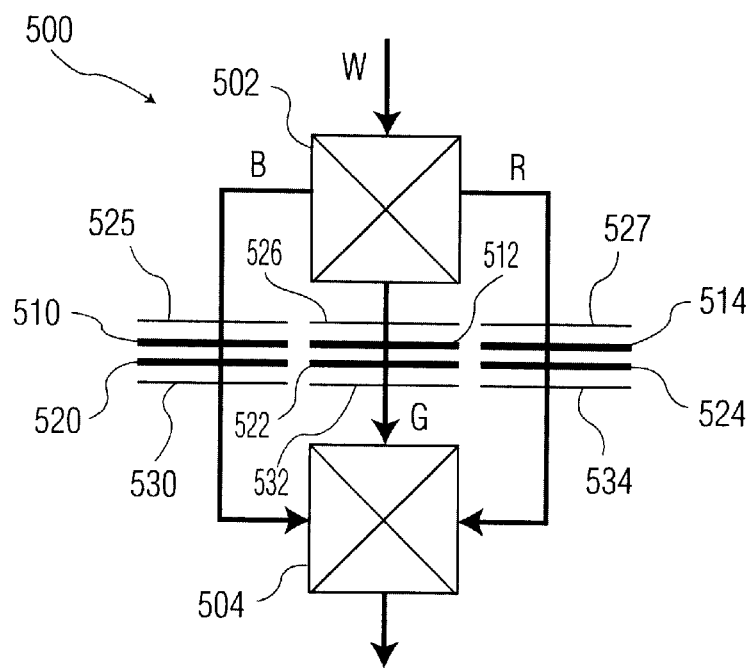

FIG. 5 shows a color video projection display system 500 comprising a color splitter 502, a color composer 504, three transmissive panels 510, 512 and 514, three low-retardance films 520, 522 and 524, three input optical path polarizers 525, 526 and 527, and three output optical path polarizers 530, 532 and 534. White light (W) is separated by color splitter 502 into blue (B), green (G) and red (R) components as shown. The blue, green and red components pass through respective polarizers 525, 526 and 527 and are applied to respective transmissive panels 510, 512 and 514.

The resulting output components modulated in the panels by corresponding blue, green and red signals pass through respective low-retardance films 520, 522 and 524 and respective polarizers 530, 532 and 534, and are then recombined in color composer 504 to obtain a modulated light signal suitable for application to a projection element for providing a viewable color display.

In the FIG. 5 embodiment, each of the low-retardance films 520, 522 and 524 is arranged in an output optical path of the system 500 between one of the transmissive panels 510, 512 or 514 and a corresponding one of the output optical path polarizers 530, 532 or 534.

Figure 6:
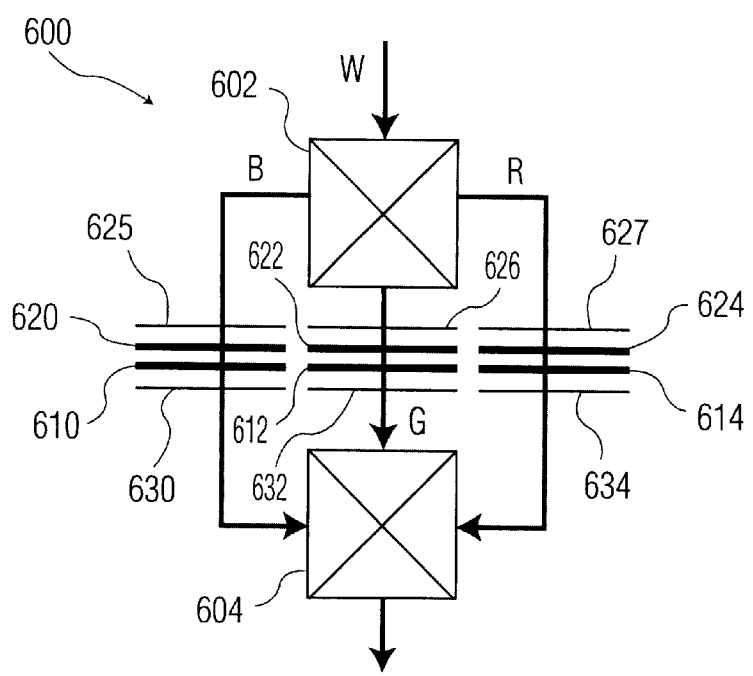

FIG. 6 shows a color video projection display system 600 comprising a color splitter 602, a color composer 604, three transmissive panels 610, 612 and 614, three low-retardance films 620, 622 and 624, three input optical path polarizers 625, 626 and 627, and three output optical path polarizers 630, 632 and 634. White light (W) is separated by color splitter 602 into blue (B), green (G) and red (R) components as shown. The blue, green and red components pass through respective polarizers 625, 626 and 627, then through respective low-retardance films 620, 622 and 624, and are then applied to respective Transmissive panels 610, 612 and 614. The resulting output components modulated in the panels by corresponding blue, green and red signals pass through respective polarizers 630, 632 and 634, and are then recombined in color composer 604 to obtain a modulated light signal suitable for application to a projection element for providing a viewable color display.

It can be seen that in the FIG. 6 embodiment, each of the low-retardance films 620, 622 and 624 is arranged within an input optical path of the system 600 between one of the input optical path polarizers 625, 626 or 627 and a corresponding one of the Transmissive panels 610, 612 or 614.

The operation of the color splitter and color composer elements of the embodiments of FIGS. 4, 5 and 6 is well known in the art, and these elements are therefore not described in further detail herein.

Figure 7:
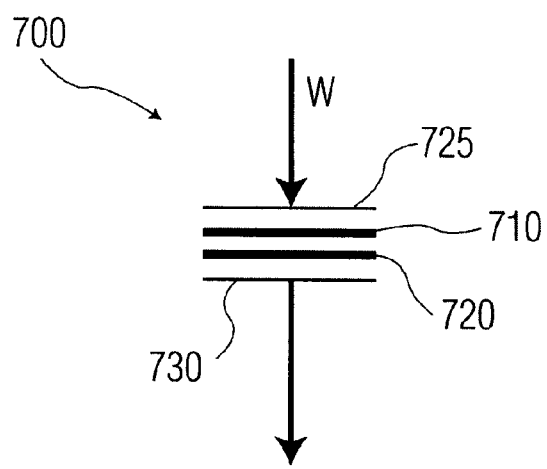
Figure 8:
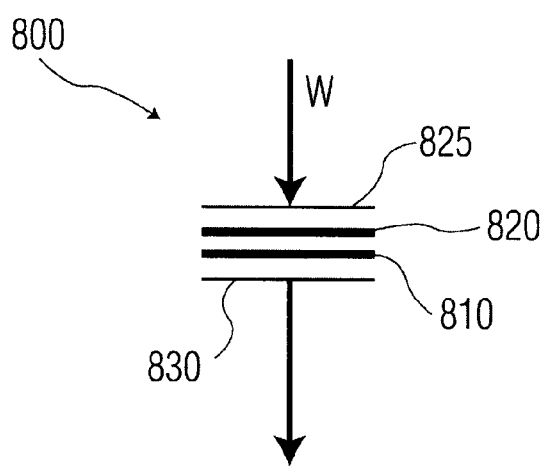

FIGS. 7 and 8 show example embodiments of on-axis transmissive single-panel color video projection display systems in accordance with the invention.

Referring to FIG. 7, a color video projection display system 700 comprises a single Transmissive panel 710, a single low-retardance film 720, an input optical path polarizer 725, and an output optical path polarizer 730. White light (W) passes through polarizer 725 and is applied to the Transmissive panel 710. The resulting output light modulated in the panel by blue, green and red signals passes through the low-retardance film 720 and polarizer 730. The output of polarizer 730 is a modulated light signal suitable for application to a projection element for providing a viewable color display.

In the FIG. 7 embodiment, the single low-retardance film 720 is arranged in an output optical path of the system 700 between Transmissive panel 710 and output optical path polarizer 730.

FIG. 8 shows color video projection display system 800 comprising a single Transmissive panel 810, a single low-retardance film 820, an input optical path polarizer 825, and an output optical path polarizer 830. White light (W) passes through polarizer 825 and the low-retardance film 820, and then is applied to the Transmissive panel 810. The resulting output light modulated in the panel by blue, green and red signals passes through polarizer 830. The output of polarizer 830 is a modulated light signal suitable for application to a projection element for providing a viewable color display.

In the FIG. 8 embodiment, the single low-retardance film 820 is arranged in an input optical path of the system 800 between the input optical path polarizer 825 and the Transmissive panel 810.

The low-retardance films in the embodiments of FIGS. 4 through 8 may be configured as in the embodiments of FIGS. 1 and 2. More particularly, each of these films may be a diacetate film having a retardance of less than about 30 nanometers.

The above-described embodiments of the invention are intended to be illustrative only. For example, the invention can be implemented using other types and arrangements of optical elements and signal processing elements. As previously noted, the invention can be implemented in both single-panel and multi-panel configurations, and can utilize any of a number of different types of light source and projection elements. In addition, reflective systems described herein can be readily reconfigured as transmissive systems and vice versa. Furthermore, the invention can be used in numerous projection display applications, including compact projectors and head-up or "near to the eye" projection display systems. These and numerous other embodiments within the scope of the following claims will be apparent to those skilled in the art.

What is claimed is:

1. An apparatus for use in a color video projection display system, the apparatus comprising:

at least one panel arranged within the system to receive via an input optical path incident light of one or more designated colors generated from a light source, the panel modulating the incident light of at least one of the colors in accordance with a corresponding applied signal, modulated incident light of the one or more colors being directed within the system from the panel via an output optical path so as to generate a viewable display of the system; and at least one low-retardance film arranged within one of (i) the input optical path of the system between an input optical path polarizer and the at least one panel and (ii) the output optical path of the system between the at least one panel and an output optical path polarizer, so as to increase a contrast ratio of the viewable display, wherein the single low-retardance film comprises a film having a retardance of 25 nanometers.

* * * * *